United States Patent
Borghese et al.

(10) Patent No.: US 11,686,535 B2
(45) Date of Patent: Jun. 27, 2023

(54) HEAT EXCHANGER

(71) Applicant: Honeywell International Inc., Charlotte, NC (US)

(72) Inventors: Joseph Borghese, Yucca Valley, CA (US); Quang Do, La Palma, CA (US); David Berukhim, Los Angeles, CA (US); Rafael Maldonado, Redondo Beach, CA (US)

(73) Assignee: Honeywell International Inc., Charlotte, NC (US)

( * ) Notice: Subject to any disclaimer, the term of this patent is extended or adjusted under 35 U.S.C. 154(b) by 126 days.

(21) Appl. No.: 17/151,534

(22) Filed: Jan. 18, 2021

(65) Prior Publication Data

US 2022/0120515 A1  Apr. 21, 2022

Related U.S. Application Data

(60) Provisional application No. 63/093,878, filed on Oct. 20, 2020.

(51) Int. Cl.
*F28D 7/06* (2006.01)
*F28D 21/00* (2006.01)
(Continued)

(52) U.S. Cl.
CPC ............. *F28D 21/001* (2013.01); *F02C 7/10* (2013.01); *F28D 7/0083* (2013.01); *F28D 7/06* (2013.01);
(Continued)

(58) Field of Classification Search
CPC . F28D 7/06; F28F 2265/26; F28F 9/02; F02C 7/08
See application file for complete search history.

(56) References Cited

U.S. PATENT DOCUMENTS

| 352,380 A | * | 11/1886 | Warden | ...................... F28F 9/02 165/83 |
| 2,692,477 A | * | 10/1954 | George | ...................... F02C 7/30 60/39.01 |

(Continued)

FOREIGN PATENT DOCUMENTS

| CN | 201787837 U | 4/2011 |
| CN | 107677148 A | 2/2018 |

(Continued)

OTHER PUBLICATIONS

Cavallo, "All About Shell and Tube Heat Exchangers—What You Need To Know," Industry Insights, retrieved from https://www.thomasnet.com/articles/process-equipment/shell-and-tube-heat-exchangers/ downloaded on Jan. 8, 2021, 4 pp.

(Continued)

*Primary Examiner* — Eric S Ruppert
(74) *Attorney, Agent, or Firm* — Shumaker & Sieffert, P.A.

(57) ABSTRACT

A heat exchanger includes a shell housing a plurality of tubes and defining an exhaust fluid flow path within a first volume enclosed by the shell. The outer surfaces of the plurality of tubes are in fluid communication with the exhaust fluid flow path. The heat exchanger includes a cap attached to a first end of the shell and defining a second volume. A header is configured to separate the first volume from the second volume, flex with thermal expansion, and define tube inlet and outlet positions. The tube inlets and outlets are in fluid communication with a source fluid flow path, and each tube is substantially U-shaped and defines a flow path of the source fluid within the exhaust fluid flow path. The heat exchanger includes at least one longitudinal flow baffle within the shell configured to reduce an amount of exhaust fluid that may bypass the tubes.

20 Claims, 6 Drawing Sheets

(51) Int. Cl.
*F02C 7/10* (2006.01)
*F28D 7/00* (2006.01)
*F28D 7/16* (2006.01)
*F28F 9/02* (2006.01)

(52) U.S. Cl.
CPC .......... *F28D 7/1607* (2013.01); *F28F 9/0243* (2013.01); *F28F 2225/08* (2013.01); *F28F 2265/26* (2013.01)

(56) References Cited

U.S. PATENT DOCUMENTS

| | | | | |
|---|---|---|---|---|
| 3,948,315 | A | | 4/1976 | Powell |
| 4,029,145 | A | * | 6/1977 | Pfouts .................... F28F 9/0219 165/161 |
| RE33,528 | E | * | 1/1991 | Doty .................... F28D 7/1653 165/173 |
| 9,062,634 | B1 | * | 6/2015 | Wu .................... F02M 26/32 |
| 10,627,166 | B2 | | 4/2020 | Nakamura et al. |
| 2005/0279098 | A1 | * | 12/2005 | Kung .................... F01K 21/00 60/670 |
| 2017/0328641 | A1 | | 11/2017 | Wang et al. |
| 2020/0166280 | A1 | | 5/2020 | Nakamura et al. |

FOREIGN PATENT DOCUMENTS

| | | | | |
|---|---|---|---|---|
| DE | 102013000210 | A1 | | 7/2014 |
| FR | 1438672 | A | | 5/1966 |
| GB | 1281327 | A | * | 7/1972 .............. F28D 7/06 |
| GB | 1281327 | A | | 7/1972 |
| GB | 2530794 | A | * | 4/2016 |
| GB | 2530794 | A | | 4/2016 |
| KR | 101689109 | B1 | | 12/2016 |
| WO | 2019115306 | A1 | | 6/2019 |

OTHER PUBLICATIONS

Response to Extended Search Report dated Feb. 2, 2022, from counterpart European Application No. 21191409.8 filed Mar. 2, 2022, 35 pp.

Extended Search Report from counterpart European Application No. 21191409.8 dated Feb. 2, 2022, 8 pp.

* cited by examiner

HEAT EXCHANGER

This application claims the benefit of U.S. Provisional Patent Application No. 63/093,878, entitled "HEAT EXCHANGER" and filed on Oct. 20, 2020, which is incorporated herein by reference in its entirety.

This invention was made with government support under DE-AR0001131 awarded by Department of Energy, Advanced Research Projects Agency-Energy. The government has certain rights in the invention.

TECHNICAL FIELD

The present disclosure relates to heat exchangers, such as recuperators.

BACKGROUND

A recuperative heat exchanger, or recuperator, may be a special purpose counter-flow energy recovery heat exchanger positioned within the supply and exhaust fluid streams of a fluid handling system, or in the exhaust gases of an industrial process, in order to recover the waste heat. A recuperative heat exchanger may be used to extract heat from the exhaust and use it to preheat air entering the combustion system. In this way, a recuperative heat exchanger may use waste energy to heat the air, offsetting some of the fuel, and thereby improve the energy efficiency of the system as a whole.

SUMMARY

In some examples, this disclosure describes a heat exchanger comprising: a shell configured to house a plurality of tubes and defining an exhaust fluid flow path within a first volume enclosed by the shell, the shell including an exhaust fluid inlet at a first end of the exhaust fluid flow path and an exhaust fluid outlet at a second end of the exhaust fluid flow path, wherein an outer surface of the plurality of tubes are in fluid communication with the flow path; a cap configured to be attached to a first end of the shell and defining a second volume, the cap including a source fluid inlet at a first end of a source fluid flow path and a source fluid outlet at a second end of the source fluid flow path; and a header configured to separate the first volume and the second volume, the header defining a tube inlet position and a tube outlet position of each of the plurality of tubes, wherein the tube inlets of the plurality of tubes are in fluid communication with the source fluid inlet and the tube outlets of the plurality of tubes are in fluid communication with the source fluid outlet, wherein the header is configured to flex with thermal expansion, wherein each of the plurality of tubes are substantially U-shaped including a U-bend and define a flow path of the source fluid within the exhaust fluid flow path.

In some examples, this disclosure describes a system comprising: a turbine mechanically coupled to a generator and a compressor; and a heat exchanger fluidically coupled to the turbine and the compressor, the heat exchanger comprising: a shell configured to house a plurality of tubes and defining an exhaust fluid flow path within a first volume enclosed by the shell, the shell including an exhaust fluid inlet at a first end of the exhaust fluid flow path and an exhaust fluid outlet at a second end of the exhaust fluid flow path, wherein an outer surface of the plurality of tubes are in fluid communication with the flow path; a cap configured to be attached to a first end of the shell and defining a second volume, the cap including a source fluid inlet at a first end of a source fluid flow path and a source fluid outlet at a second end of the source fluid flow path; and a header configured to separate the first volume and the second volume, the header defining a tube inlet position and a tube outlet position of each of the plurality of tubes, wherein the tube inlets of the plurality of tubes are in fluid communication with the source fluid inlet and the tube outlets of the plurality of tubes are in fluid communication with the source fluid outlet, wherein the header is configured to flex with thermal expansion, wherein each of the plurality of tubes are substantially U-shaped including a U-bend and define a flow path of the source fluid within the exhaust fluid flow path.

In some examples, this disclosure describes a method comprising: receiving a source fluid at a source fluid inlet of a heat exchanger; receiving an exhaust fluid at an exhaust fluid inlet of the heat exchanger; heating, via a heat exchanger, the source fluid via transfer of heat from the exhaust fluid, wherein the heat exchanger comprises: a shell configured to house a plurality of tubes and defining an exhaust fluid flow path within a first volume enclosed by the shell, the shell including an exhaust fluid inlet at a first end of the exhaust fluid flow path and an exhaust fluid outlet at a second end of the exhaust fluid flow path, wherein an outer surface of the plurality of tubes are in fluid communication with the flow path; a cap configured to be attached to a first end of the shell and defining a second volume, the cap including a source fluid inlet at a first end of a source fluid flow path and a source fluid outlet at a second end of the source fluid flow path; and a header configured to separate the first volume and the second volume, the header defining a tube inlet position and a tube outlet position of each of the plurality of tubes, wherein the tube inlets of the plurality of tubes are in fluid communication with the source fluid inlet and the tube outlets of the plurality of tubes are in fluid communication with the source fluid outlet, wherein the header is configured to flex with thermal expansion and reduce stress within the header and on the plurality of tubes.

The details of one or more examples are set forth in the accompanying drawings and the description below. Other features, objects, and advantages will be apparent from the description and drawings, and from the claims.

BRIEF DESCRIPTION OF THE DRAWINGS

The details of one or more examples are set forth in the accompanying drawings and the description below. Other features, objects, and advantages will be apparent from the description and drawings, and from the claims.

DETAILED DESCRIPTION

Figure 1:
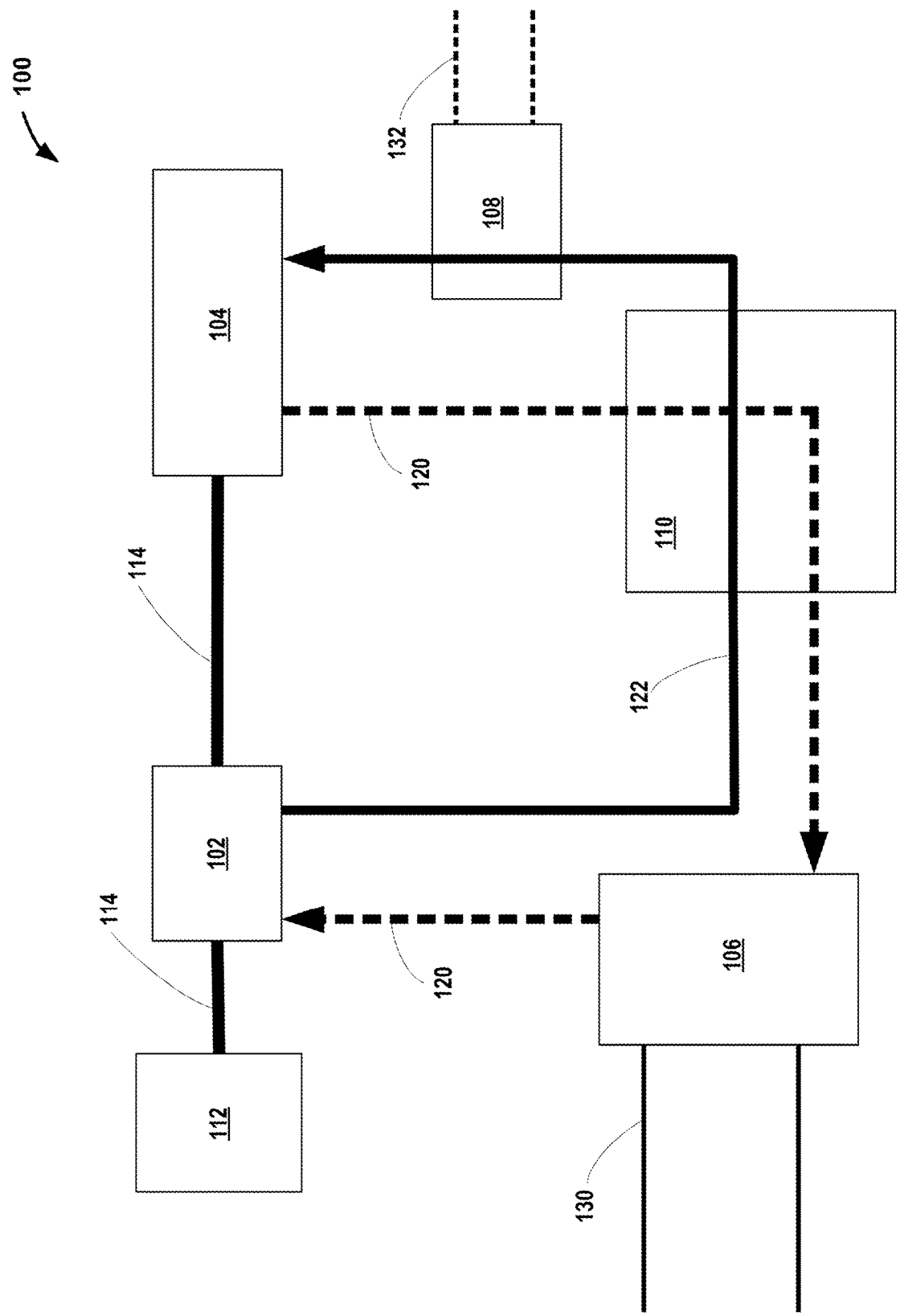
FIG. 1 is a diagram illustrating an example system for generating power, in accordance with examples of the present disclosure.

In some examples, this disclosure relates to a heat exchanger that may function as a recuperative heat exchanger. In some examples, the heat exchanger includes relatively small diameter source fluid tubes that are closely spaced, a flexible tube header, and/or baffles within the exhaust fluid volume configured to limit the exhaust fluid from taking a flow path that bypasses the source fluid tubes.

A super critical carbon dioxide ($SCO_2$) power system may include a recuperative heat exchanger that transfers heat from a low pressure, high temperature turbine exhaust fluid to a high pressure, low temperature heat source inlet fluid. Supercritical carbon dioxide ($SCO_2$) cycles may use carbon dioxide that is in a supercritical state, e.g., at a temperature and pressure above its critical point and in a fluid state where the liquid and gas phases of $SCO_2$ are not distinguishable. If the temperature and pressure of carbon dioxide are both increased be at or above the critical point for carbon dioxide, the carbon dioxide may adopt properties midway between a gas and a liquid. In this state, the $SCO_2$ can be used efficiently throughout an entire Brayton cycle.

Carbon dioxide may be compressed directly to supercritical pressures and readily heated to a supercritical state before expansion. In a heat engine, this can facilitate obtaining a good thermal match with the heat source. Carbon dioxide near its critical point may become more incompressible, and the work needed to compress the carbon dioxide near its critical point may be reduced and the system may consequently have a high efficiency. In addition, carbon dioxide in a supercritical state may also be nearly twice as dense as steam. $SCO_2$ may have a higher energy density due to having a higher density and volumetric heat capacity relative to other working fluids, which may allow the size of most system components, e.g., the turbine and pump, to be reduced thereby reducing power plant size and capital costs to build a $SCO_2$ power plant relative water or steam based power plants. $SCO_2$ may be non-explosive, non-flammable, non-toxic, and relatively cheap.

Supercritical carbon dioxide power cycles may have a high thermal efficiency and smaller rotating components when compared to similar air or gas power cycles, such as power plant cycles that produce power from turbines using water or steam as the working fluid. At a heat exchanger in a $SCO_2$ system, the high temperature fluid, e.g., exhaust fluid, may be 1500° F. and 1200 pounds per square inch absolute (psia) and the low temperature fluid, e.g., source fluid, may be 600° F. and 3700 psia. In some examples, the exhaust fluid and/or the source fluid may range in temperature from ambient temperature, e.g., about 65° F., to 1800° F., and may range in pressure from atmospheric pressure, e.g., about 14 psia, to 3800 psia. Because of these high pressures, a shell and tube heat exchanger design may be required to structurally contain the fluids with minimal wall sections. Fluid separators, such as source fluid tubes and a header wall between an exhaust fluid volume and a source fluid volume, may be flexible to withstand thermal stresses from thermal expansion due to the temperature gradient, e.g., 1500° F. to 500° F., between the exhaust and source fluids.

FIG. 1 is a diagram illustrating an example system 100 for generating power, in accordance with examples of the present disclosure. In the example shown, system 100 includes turbine 102, compressor 104, heater 106, cooler 108, heat exchanger 110, e.g., a recuperative heat exchanger, and generator 112. Turbine 102 may be mechanically coupled to generator 112 via shaft 114, and turbine 102 may also be mechanically coupled to compressor 104 via shaft 114. In some examples, turbine 102 provides rotary power to generator 112 and compressor 104 via shaft 114.

System 100 may be a recuperated closed-loop Brayton cycle using carbon dioxide as the working fluid. In the example shown, heater 106 may be configured to heat the working fluid indirectly, e.g., as steam would be heated in a conventional boiler. In the example shown, heater 106 may be configured to heat the working fluid with heat supplied by a heating fluid in flow path 130, e.g., via a heat exchange. Heater 106 may be fluidically coupled to turbine 102 and the working fluid may flow from heater 106 to turbine 102 via flow path 120. In the example shown, the working fluid flowing from heater 106 to turbine 102 may be a high pressure fluid and may be referred to as a source fluid, e.g., the source of thermal energy to be converted by turbine 102 into mechanical energy. In some examples, the source fluid may be $SCO_2$, e.g., carbon dioxide in a supercritical state having a pressure and temperature above the critical point.

In the example shown, turbine 102 may be configured to extract energy from the source fluid and to convert the extracted energy to mechanical energy. Turbine 102 may be configured to provide the mechanical energy to generator 112 and compressor 104 via shaft 114. For example, thermal energy may be extracted from the source fluid as it is expanded in the turbine and converted into mechanical energy, and the depleted source fluid may then exit the turbine as an exhaust fluid having a lower pressure and temperature than the source fluid. In some examples, the exhaust fluid may be carbon dioxide that has a pressure and/or temperature less than the critical point. In other examples, the exhaust fluid may be carbon dioxide that is supercritical. In some examples, the working fluid of system 100 may be carbon dioxide that is supercritical throughout the cycle, e.g., as exhaust fluid and source fluid. In the example shown, generator 112 may receive the mechanical energy via shaft 114 and convert the mechanical energy into electrical energy, and compressor 104 may receive the mechanical energy via shaft 114 and use it to compress the exhaust fluid, as described below.

Heat exchanger 110 may be configured to heat the high pressure, low temperature source fluid in flow path 120 from compressor 104 via a heat exchange (e.g., through conductive heat transfer) with the low pressure, high temperature exhaust fluid in flow path 122 from turbine 102. Heat exchanger 110 may improve the efficiency of system 100, e.g., by reducing the heat rejection in cooler 108. In some examples, system 100 may include a recompression stage (not shown).

In some examples, heat exchanger 110 may be configured to cause the low pressure, high temperature exhaust fluid to flow in a counter flow arrangement in which the exhaust fluid comes into fluidic contact multiple times (e.g., a multi-pass, counterflow arrangement) with an outside surface of each of a plurality of tubes within which the high pressure, low temperature source fluid flows. Although a multi-pass, counterflow arrangement is illustrated, heat exchanger 110 may include a single-pass and/or complementary flow arrangement.

In some examples, each of the plurality of tubes may have a relatively small diameter, e.g., an outer diameter 3 millimeters (mm) or less, 2 mm or less, or 1 mm or less. In some examples, the plurality of tubes may have a tube wall thickness of about 2 mm or less, 1 mm or less, 0.5 mm less, 0.2 mm or less, or 0.1 mm or less. For example, each of the plurality of tubes may have an outer diameter of about 1 mm and a tube wall thickness of about 0.2 mm, and a clear aperture diameter of about 0.8 mm. Additionally, the tubes may be closely spaced, e.g., having a distance of 1 mm or less, or 0.5 mm or less between the outside surfaces of adjacent tubes. In some examples, small diameter tubes closely spaced may provide a large and/or increased heat transfer surface area within a relatively small volume. In some examples, the heat transfer surface area per volume may be 1000 meters square per meters cubed ($m^2/m^3$) or greater, 1500 $m^2/m^3$ or greater, 1800 $m^2/m^3$ or greater, or 2000 $m^2/m^3$ or greater. In some examples, the small diameter, closely spaced tubes may have a reduced pressure and transient thermal buckling resistance. Consequently, in some examples, the tubes may be U-shaped and unconstrained at the U-bend and reducing buckling due to thermal expansion and may be mechanically coupled to a header located at one end of heat exchanger 110. In some examples, the tubes may be made of (e.g., comprise, consist, or consist essentially of) a metal. For example, the tubes may be made of a superalloy comprising nickel, chromium, cobalt, molybdenum, such as Haynes® 282®, and may be drawn and bent to form the U-shape. In some examples, the tubes may be made from any suitable material via any suitable method.

In some examples, heat exchanger 110 may include a header configured to be flexible and thereby reduce and/or mitigate thermal stresses and/or thermally induced mechanical stresses in the header and/or tube-to-header joints. For example, the header may include a thin portion, e.g., a portion of the header with reduced thickness that separates a first portion of the header including the inlets of the tubes from a second portion of the header including the outlets of the tubes. The thin portion may reduce conduction heat transfer between the first and second portions and thereby reduce a thermal gradient between the first and second portions, and the thin portion may increase header flexibility to reduce and/or mitigate thermal and or mechanical stresses in the header.

In some examples, heat exchanger 110 may include one or more baffles within the exhaust fluid flow path within heat exchanger 110. The baffles may be configured to limit the exhaust fluid from taking a lower pressure drop path along the inside surface of the shell of heat exchanger 110 and bypassing the tube bundle. In some examples, the baffles may enable a more rectangular tube bundle with fewer U-tube bend radii and lower overall cost, e.g., relative to adding and/or placing more tubes closer to the inner surface of the shell.

In the example shown, cooler 108 may be fluidically coupled to heat exchanger 110 and may receive the exhaust fluid from heat exchanger 110. In the example shown, cooler 108 may be configured to cool the exhaust fluid by removing heat from the exhaust fluid via a cooling fluid supplied by cooling fluid low path 132, e.g., via a heat exchange. Cooler 108 may be fluidically coupled to compressor 104 and the exhaust fluid may flow from cooler 108 to compressor 104 via flow path 122.

In the example shown, compressor 104 may be configured to compress the exhaust fluid and increase a pressure of the exhaust fluid, e.g., via the mechanical energy supplied by shaft 114 from turbine 102. In some examples, the exhaust fluid may be compressed such that its pressure is greater than a critical point pressure and may be a source fluid for turbine 102 after exiting compressor 104. In some examples, the compressed exhaust fluid, e.g., the source fluid exiting compressor 104 may be supercritical. In other examples, the source fluid exiting compressor 104 may not be supercritical. In other words, the exhaust fluid may be compressed to a pressure greater than a pressure needed to exceed the critical point of the fluid by the compressor, but may not be supercritical when exiting the compressor as the source fluid because the temperature and the fluid may be below the temperature needed to exceed the critical point. In the example shown, heat exchanger 110 may receive the source fluid via source fluid path 120 from compressor 104, and heat exchanger 110 may be configured to heat the high pressure, low temperature source fluid in flow path 120 from compressor 104 via a heat exchange with the low pressure, high temperature exhaust fluid in flow path 122 from turbine 102, as described above.

Figure 2:
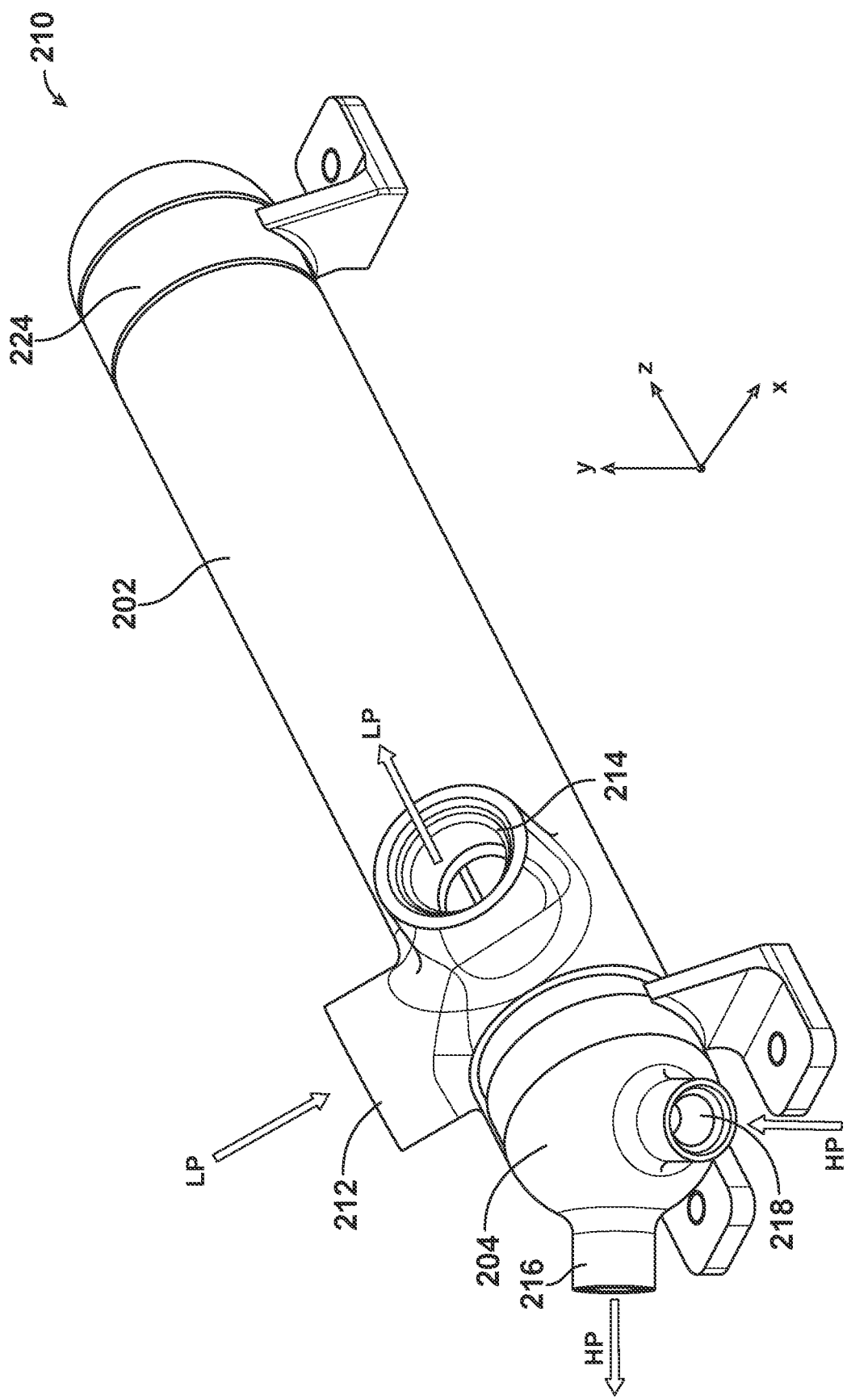
FIG. 2 is a perspective view illustrating an example heat exchanger, in accordance with examples of the present disclosure.

FIG. 2 is a perspective view illustrating an example heat exchanger 210, in accordance with examples of the present disclosure. In the example shown, heat exchanger 210 includes shell 202 and cap 204. In some examples, heat exchanger 210 may be formed as a brazed and welded assembly. Heat exchange 210 may be an example of heat exchanger 110 in FIG. 1.

Shell 202 may be configured to house a plurality of tubes and define an exhaust fluid flow path within a shell volume enclosed by the shell. In the example shown, shell 202 is cylindrical with a circular cross-section. In other examples, shell 202 may have a rectangular cross-sectional shape, a spherical or spheroid shape, or any other suitable shape. Shell 202 may be made from any suitable material, e.g., a material suitable to retain the exhaust fluid within the shell volume. In some examples, shell 202 may be made of (e.g., comprise, consist, or consist essentially of) a metal and/or a metal alloy. For example, shell 202 may be made of a superalloy comprising nickel, chromium, cobalt, molybdenum, such as Haynes® 282®, and may be drawn from tube stock, made by rolling and welding sheet stock, or may be formed by any other suitable method.

In some examples, at least a portion of exhaust fluid flow path 122 is within the shell volume enclosed by shell 202. Shell 202 may include an exhaust fluid inlet 212 and an exhaust fluid outlet 214. In some examples, exhaust fluid inlet 212 comprises a first end of exhaust fluid flow path 122 within shell 202 and exhaust fluid outlet 214 comprises a second end of the exhaust fluid flow path 122 within shell 202. Exhaust fluid inlet 212 may be configured to be fluidically coupled to exhaust fluid flow path 122 to receive exhaust fluid from turbine 102 and exhaust fluid outlet 214 may be configured to be fluidically coupled to exhaust fluid flow path 122 to provide exhaust fluid to compressor 104, e.g., via cooler 108, as illustrated and described above with reference to FIG. 1.

Cap 204 may be configured to be attached to a first end of shell 202 and may be configured to define a portion of a source fluid flow path within a cap volume enclosed by cap 204 and separated from the shell volume by a header, e.g., header 400 as illustrated and described below with reference to FIGS. 4-6. Cap 204 may be made from (e.g., comprise, consist, or consist essentially of) any suitable material, e.g., a material suitable to retain the source fluid within the cap volume. In some examples, cap 204 may be made of a metal and may be cast, machined, additively manufactured, or formed by any other suitable method. In some examples, at least a portion of source fluid flow path 120 is within the cap volume enclosed by cap 204. Cap 204 may include a source fluid inlet 218 and a source fluid outlet 216. In some examples, source fluid inlet 218 comprises a first end of source fluid flow path 120 within cap 204 and source fluid outlet 216 comprises a second end of the source fluid flow path 120 within cap 204. Source fluid inlet 218 may be configured to be fluidically coupled to source fluid flow path 120 to receive source fluid from compressor 104 and source fluid outlet 216 may be configured to be fluidically coupled to source fluid flow path 120 to provide source fluid to turbine 102, e.g., via heater 106, as illustrated and described above with reference to FIG. 1.

In the example shown, heat exchanger 210 includes endcap 224. In some examples, endcap 224 may be configured to be attached to a second end of shell 202, e.g., opposite from cap 204. In some examples, endcap 224 may be part of shell 202 rather than separately attached to shell 202. In some examples, the volume enclosed by endcap 224 is a portion of the shell volume and is in fluid communication with the volume enclosed by shell 202.

Figure 3:
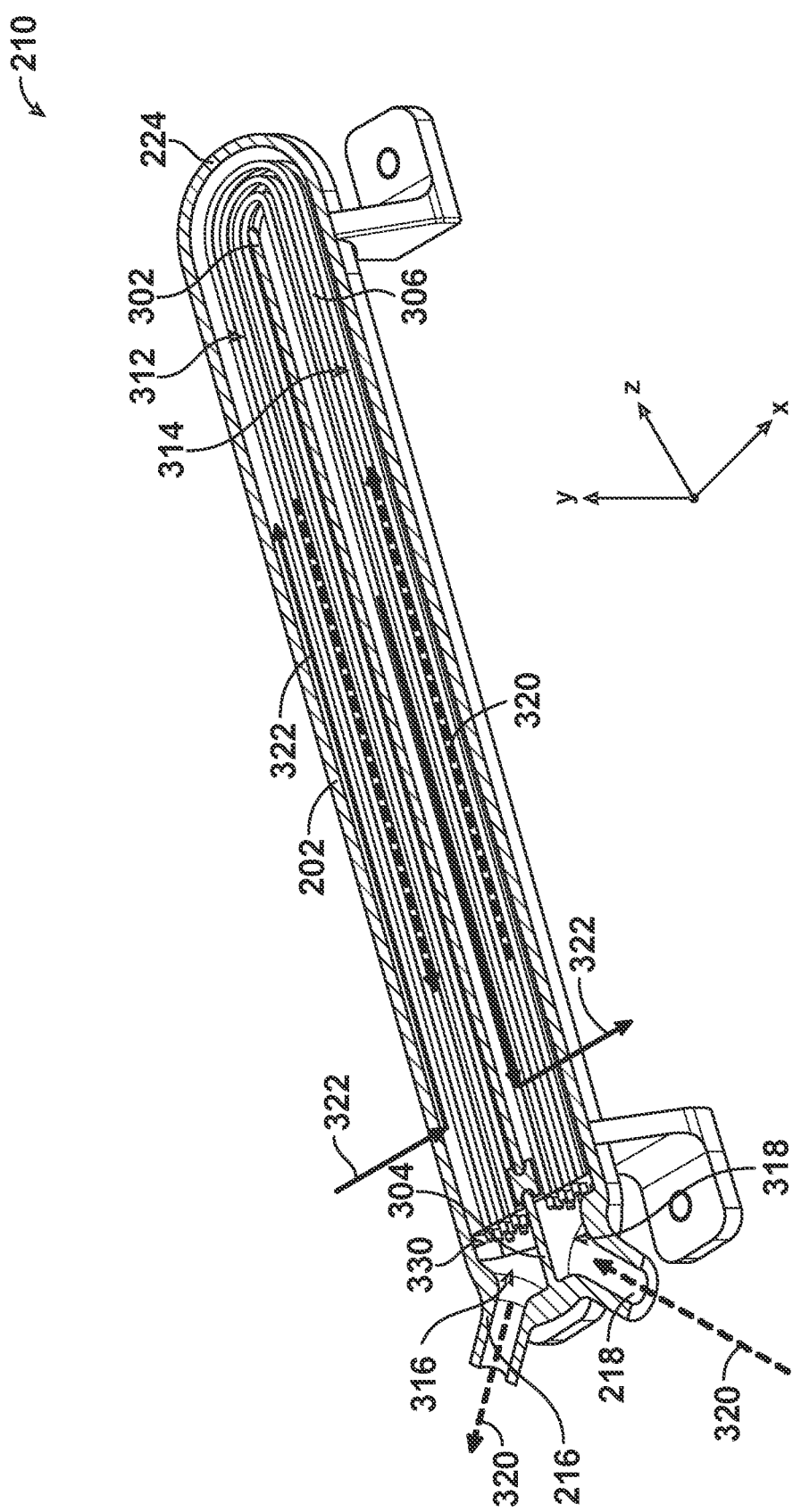
FIG. 3 is a perspective view illustrating an inner portion of an example heat exchanger, in accordance with examples of the present disclosure.

FIG. 3 is a perspective view illustrating an inner portion of an example heat exchanger 210, in accordance with examples of the present disclosure. FIG. 3 illustrates a bottom portion of shell 202 and cap 204 with the top portions removed to show a view of the plurality of tubes and the volumes enclosed by shell 202 and cap 204 and example exhaust fluid flow path 322 and source fluid flow path 320 within the shell volume. In some examples, shell 202 may comprise a top portion and a bottom portion, and in other examples shell 202 may comprise a contiguous component and FIG. 3 illustrates a portion of shell 202 removed to illustrate a view inside of shell 202.

In the example shown, heat exchanger 210 includes shell volume separator 302. Shell volume separator 302 may be configured to separate the shell volume into first and second separate portions 312 and 314 and may cause exhaust fluid to flow throughout the entire shell volume, e.g., down the length of shell 202 from the first end of shell 202 attached to cap 202 to the second end of shell 202 and endcap 224 within inlet shell volume portion 312 and back from the second end of shell 202 and endcap 224 back to the first end of shell 202 attached to cap 202 within outlet shell volume portion 314. Shell volume separator 302 may be an integral part of shell 202 and formed with shell 202 or may be attached to shell 202. In the example shown, shell volume separator 302 may be a continuous wall configured to fluidically separate two circumferential halves of the shell volume, e.g., inlet and outlet shell volume portions 312 and 314, and prevent fluid communication between the first and second shell volumes except at the second end of shell 202. That is, shell volume separator 302 may be attached to the top and bottom of shell 202 and run from the first end of shell 202 towards the second end of shell 202 and have a length that is less than the full inner length of shell 202. In some examples, inlet shell volume portion 312 may be fluidically coupled to exhaust fluid inlet 212 (not shown) and may be in fluid communication with outlet shell volume portion 314, e.g., at the second end of shell 202 near endcap 224 and the end of shell volume separator 302. Outlet shell volume portion 314 may be fluidically coupled to exhaust fluid outlet 214 (not shown). In some examples, exhaust fluid inlet 212, inlet shell volume portion 312, outlet shell volume portion 314, and exhaust fluid outlet 214 may define exhaust fluid flow path 322 within shell 202, e.g., within the shell volume.

In the example shown, heat exchanger 210 includes cap volume separator 304. Cap volume separator 304 may be configured to separate the cap volume into first and second separate portions 318 and 316 and may cause source fluid to flow through plurality of tubes 306 within the shell volume, e.g., down the length of shell 202 and back within plurality of tubes 306. Cap volume separator 304 may be an integral part of cap 204 and formed with cap 204 or may be attached to cap 204. In the example shown, cap volume separator 304 may be a continuous wall configured to fluidically separate two halves of the cap volume, e.g., to prevent fluid communication between inlet and outlet cap volume portions 318 and 316 except via plurality of tubes 306. In some examples, inlet cap volume portion 318 may be fluidically coupled to source fluid inlet 218 and may be in fluid communication with outlet cap volume portion 316 via plurality of tubes 306. Outlet cap volume portion 316 may be fluidically coupled to source fluid outlet 216. In some examples, source fluid inlet 218, inlet cap volume portion 318, plurality of tubes 306, outlet cap volume portion 316, and source fluid outlet 216 may define source fluid flow path 320 within heat exchanger 210.

In some examples, the shell volume and the cap volume may be fluidically separated by a header (not shown) located at position 330, such as header 400 as illustrated and described with reference to FIGS. 4-6. In some examples, plurality of tubes 306 may comprise two or more tubes which may be substantially U-shaped including a U-bend, e.g., at the second end of shell 202 near and/or within endcap 224, and the U-bend may allow each of the plurality of tubes to run down the length of shell 202 within outlet shell volume portion 314, bend around shell volume separator 302, and run back the length of shell 202 within inlet shell volume portion 312. In some examples, plurality of tubes 306 may be coupled to the header, e.g., via tube joints configured to fluidically couple a first inlet end of each of the plurality of tubes 306 to inlet cap volume portion 318 and a second outlet end of each of the plurality of tubes 306 to outlet cap volume portion 316.

Figure 4:
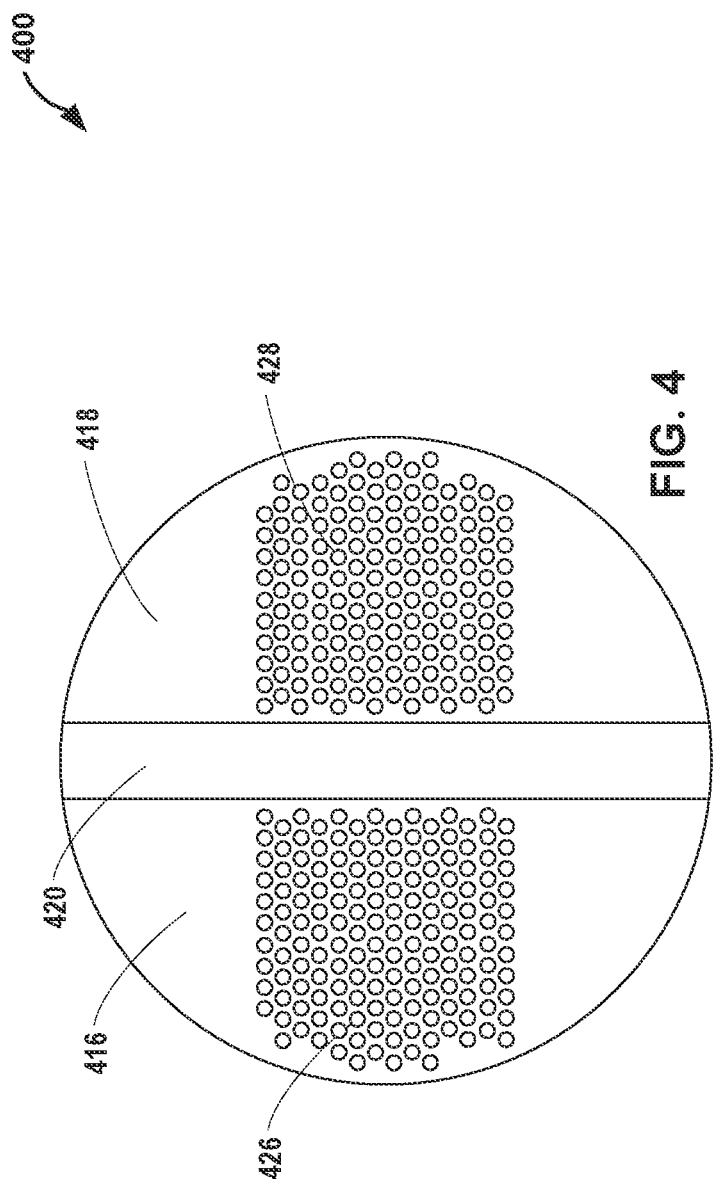
FIG. 4 is a front view of an example header, in accordance with examples of the present disclosure.
Figure 5:
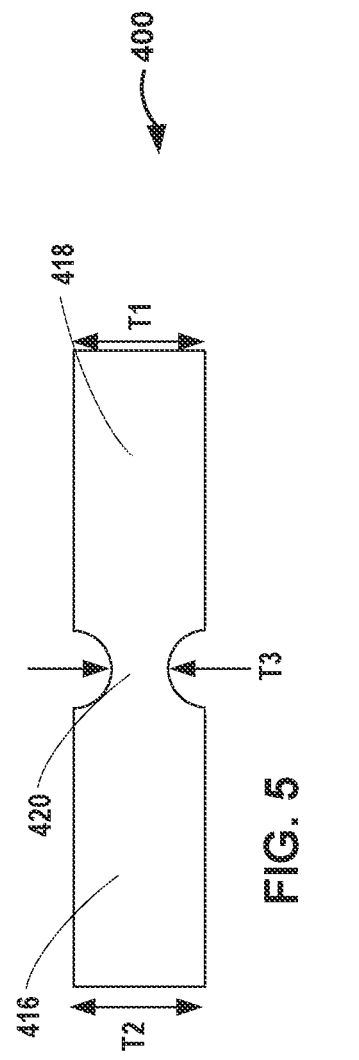
FIG. 5 is a top view of an example header, in accordance with examples of the present disclosure.

FIG. 4 is a front view of an example header 400, in accordance with examples of the present disclosure. FIG. 5 is a top view of example header 400, in accordance with examples of the present disclosure. FIGS. 4-5 are described together below. Header 400 may be employed in heat exchanger 110 and/or heat exchanger 210 illustrated and described above with reference to FIGS. 1-3.

In the example shown, header 400 includes inlet cross-sectional area 418, outlet cross-sectional area 416, and flex cross-sectional area 420.

Header 400 may be configured to separate the shell volume from the cap volume of heat exchanger 110 and/or 210. In the example shown, inlet cross-sectional area 418 includes a plurality of tube inlets 428, e.g., holes configured to attach an inlet end of each of the plurality of tubes 306 to header 400 and to fluidically couple the inlet end of each of the plurality of tubes 306 to inlet cap volume portion 318. As shown, each of the plurality of tube inlets 428 define a tube inlet position of each of the plurality of tubes 306.

In the example shown, outlet cross-sectional area 416 includes a plurality of tube inlets 426, e.g., holes configured to attach an outlet end of each of the plurality of tubes 306 to header 400 and to fluidically couple the outlet end of each of the plurality of tubes 306 to outlet cap volume portion 316. As shown, each of the plurality of tube outlets 426 define a tube outlet position of each of the plurality of tubes 306. In the example shown, inlet cross-sectional area 418 and outlet cross-sectional area 416 are separated by flex cross-sectional area 420. In some examples, cap volume separator 304 may be configured to mate with flex cross-sectional area 418, e.g., so as to fluidically separate inlet cap volume portion 318 and outlet cap volume portion 316, as illustrated in FIG. 3, and prevent the source fluid from flowing between inlet cap volume portion 318 and outlet cap volume portion 316 via bypassing plurality of tubes 306. In some examples, header 400 is configured to be flex with thermal expansion. For example, flex cross-sectional area 420 may have a thickness that is less than a thickness of both inlet cross-sectional area 418 and outlet cross-sectional area 416, e.g., where the thickness is in the longitudinal direction of heat exchanger 110 and/or 210 separating the shell volume from the cap volume. As shown, inlet cross-sectional area 418 may have a thickness T1, outlet cross-sectional area 416 may have a thickness T2, and flex cross-sectional area 420 may have a thickness T3. In some examples, T1 and T2 may be substantially the same thickness, and T3 may be less than both T1 and T2. For example, thicknesses T1 and T2 may be about 0.375 inches and thickness T3 may be about 0.1875 inches. In some examples, the reduced thickness of flex cross-sectional area 420 may enable header 400 to flex under a differential thermal expansion and thereby reduce thermal and mechanical stresses on header 400 and tube-to-header joints, e.g., braze or weld joints, or couplings such as compression fittings and/or any other suitable attachment between tubes 306 and tube inlets 428 and tube outlets 426. For example, the temperature of a volume and/or fluid in thermal contact with a surface of header 400 may vary depending on surface area position. In one example, the temperature (and pressure) in contact with the surface of inlet cross-sectional area 418 on both the cap-side and the shell-side may be significantly different, e.g., a 250° F. or greater temperature difference, a 500° F. or greater temperature difference, a 1000° F. or greater temperature difference or more. Similarly, the temperature (and pressure) in contact with the surface of inlet cross-sectional area 416 on both the cap-side and the shell-side may be significantly different, e.g., a 250° F. or greater temperature difference, a 500° F. or greater temperature difference, a 1000° F. or greater temperature difference or more. Additionally, the temperature in contact with the surface of inlet cross-sectional area 416 and the surface of outlet cross-sectional area 418 may be significantly different from each other on the cap-side, as well as on the shell-side. For example, the temperature difference across header 400 on the cap-side from inlet cross-sectional area 416 to outlet cross-sectional area 418 may be about 715° F., e.g., with an inlet cross-sectional area 416 temperature of about 660° F. and an outlet cross-sectional area 418 temperature of about 1375° F. In some examples, the temperature difference across header 400 on the cap-side from inlet cross-sectional area 416 to outlet cross-sectional area 418 may be about 500° F. or greater, 750° F. or greater, 1000° F. or greater, or 1500° F. or greater. In this example, there may be a significant temperature difference between all four surfaces, e.g., cap-side inlet cross-sectional area 416, shell-side inlet cross-sectional area 416, cap-side outlet cross-sectional area 418, and shell-side outlet cross-sectional area 418. Flex cross-sectional area 420 may be configured to both reduce thermal conduction between inlet cross-sectional area 418 and outlet cross-sectional area 416 and to reduce thermal and mechanical stresses in header 400 arising from the resulting differential thermal expansions by allowing header 400 to flex in a pre-determined area, namely, flex cross-sectional area 420.

In some examples, header 400 may be made of a superalloy comprising nickel, chromium, cobalt, molybdenum, such as Haynes® 282®, and may be machined from bar stock. In some examples, header 400 may be additively manufactured.

Figure 6:
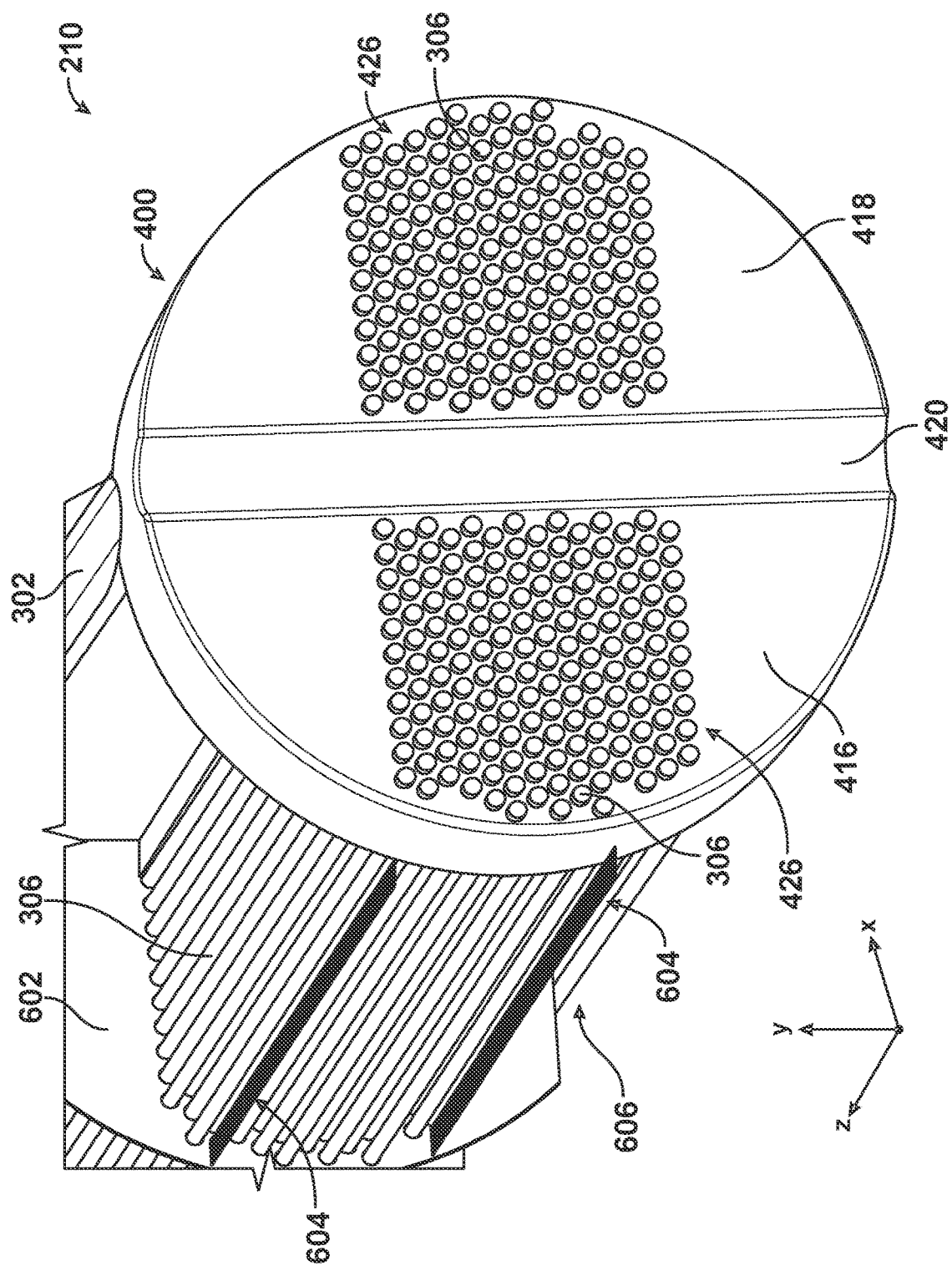
FIG. 6 is a perspective view illustrating an inner portion of an example heat exchanger including header, in accordance with examples of the present disclosure.

FIG. 6 is a perspective view illustrating an inner portion of an example heat exchanger 210 including header 400, in accordance with examples of the present disclosure. FIG. 6 illustrates a portion of heat exchanger 210 with shell 202 an cap 204 removed to show a view of the plurality of tubes 306 and flow baffles 604. In the example shown, heat exchanger 210 includes header 400, shell volume separator 302, plurality of tubes 306, radial baffles 602, and longitudinal baffles 604.

Radial baffle 602 may be configured to prevent a longitudinal flow of the exhaust fluid within the shell volume, except at flow portion 606. For example, radial baffle 602 may be configured to have a diameter substantially the same as an inner diameter of shell 202 and may prevent flow of the exhaust fluid in the longitudinal direction, e.g., the z-direction, within the shell volume. Radial baffle 602 may have a flow portion 606, e.g., a portion missing to allow longitudinal flow of the exhaust fluid within the shell volume.

By way of example, heat exchanger 210 may include exhaust fluid inlet 212 (not shown) positioned at the "top" or "above" the plurality of tubes 306, e.g., with respect to the y-direction as shown, and longitudinally located between header 400 and radial baffle 602. The flow of the exhaust fluid may be constrained by shell volume separator 302, header 400, shell 202, and radial baffle 602 to flow through the plurality of tubes 306 to flow portion 606 at the "bottom" or "below" the plurality of tubes 306 in this first section of the shell volume. Subsequently, heat exchanger 210 may include another radial baffle 602 (not shown) positioned further longitudinally down heat exchanger 210 towards endcap 224 (not shown) that may have a flow portion 606 at the "top" or "above" the plurality of tubes. As such, the exhaust fluid is constrained to flow through the plurality of the tubes from the bottom to the top, e.g., in the y direction, by the radial baffles 602, shell 202, and shell volume separator 302 in this second section of the shell volume. In some examples, heat exchanger 210 may include a plurality of sections as described above in which the exhaust fluid is constrained to flow through the plurality of tubes 306 in serpentine manner in the y-direction from the exhaust fluid inlet 212 to the exhaust fluid outlet 214 and thereby come into fluidic contact multiple times with an outside surface of each of the plurality of tubes 306, e.g., heat exchanger 210 may include a multi-pass arrangement. Each "pass" of the exhaust fluid through plurality of tubes 306 may result in an exchange of heat from the relative hot exhaust fluid to the relatively cold source fluid flowing within plurality of tubes 306 via conduction by the tube walls of each of the plurality of tubes 306.

In some examples, each of the plurality of tubes 306 may have a circular cross-sectional shape with a relatively small diameter and the plurality of tubes may be closely spaced, e.g., as described above with reference to FIG. 1. In some examples, each of the plurality of tubes 306 may have a non-circular cross-sectional shape, e.g., an oval shape, a rectangular shape, or any other shape, and may have a relative small cross-sectional area substantially similar to the cross-sectional areas of the a circular cross-sectional shape having an outer diameter of 3 mm or less, 2 mm or less, or 1 mm or less. In some examples, a spacing between the outer tubes and shell 202 (not shown) may be larger than the spacing between each of the plurality of tubes 306. At least of portion of the exhaust fluid may then bypass flowing through the plurality of tubes and may flow along the inner surface of shell 202.

In some examples, one or more longitudinal flow baffles 604 may be configured to reduce an amount of the shell volume in which the exhaust fluid may flow that bypasses plurality of tubes 306. For example, longitudinal flow baffles 604 may be attached to the inner surface of shell 202 and may prevent the exhaust fluid from flowing along the inner surface of shell 202 and may force the exhaust fluid radially inwards and to flow through plurality of tubes 306. In some examples, longitudinal flow baffles 604 may be attached to a surface of shell volume separator 302 and may prevent the exhaust fluid from flowing along the inner surface of shell volume separator 302 and may force the exhaust fluid to flow through plurality of tubes 306. In some examples, longitudinal flow baffles 604 may be attached to any suitable surface and/or component of heat exchanger 210 such that longitudinal flow baffles 604 may prevent the exhaust fluid from bypassing plurality of tubes 306 and force the exhaust fluid through plurality of tubes 306. In some examples, longitudinal flow baffles 604 may be made of a metal and may be machined from sheet stock or additively manufactured. In some examples, longitudinal baffles 604 may be made from any suitable material and may be formed by any suitable method. In some examples, longitudinal flow baffles 604 may reduce the number of the plurality of tubes 306, may enable a more rectangular plurality of tubes 306 and reduce the number of U-tube bend radii of plurality of tubes 306, and may lower the overall cost of heat exchanger 210.

In the example shown, plurality of tubes 306 are attached to header 400 via tube inlets 428 and tube outlets 426. In some examples, the inlet and outlet ends of each of the plurality of tubes 306 may extend into inlet cap volume portion 318 and outlet cap volume portion 316, respectively, as illustrated.

Figure 7:
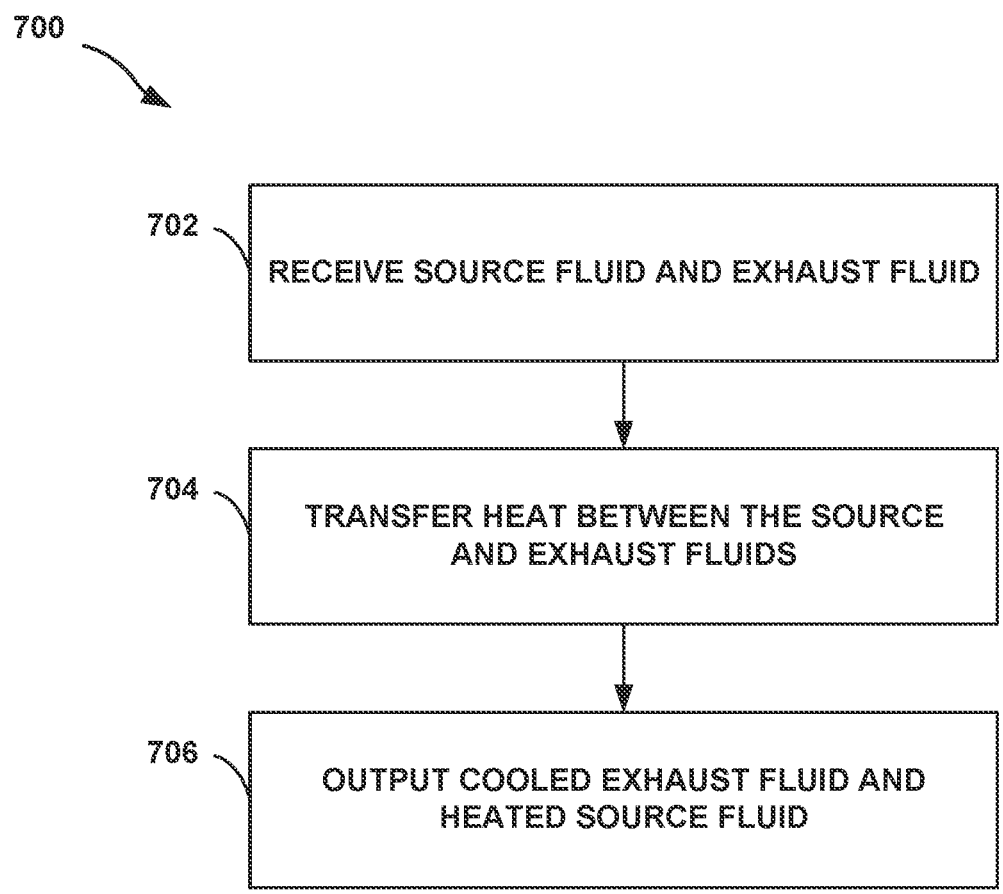
FIG. 7 is a flowchart of an example method of exchanging heat via heat exchanger, in accordance with examples of the present disclosure.

FIG. 7 is a flowchart of an example method of exchanging heat via heat exchanger 210, in accordance with examples of the present disclosure. A source fluid may be received at a source fluid inlet and an exhaust fluid may be received at an exhaust fluid inlet (702). For example, source fluid inlet 218 may be fluidically coupled to a source fluid flow path 120, 320 to receive a cooled and compressed source fluid from compressor 104, and exhaust fluid inlet 212 may be fluidically coupled to an exhaust flow path 122, 322 to receive a heated and decompressed exhaust fluid from turbine 102.

Heat may be transferred between the source fluid and exhaust fluid within heat exchanger 210 (704). For example, heat exchanger 210 may include a counterflow, multi-pass arrangement, as described above, in which the exhaust fluid exchanges transfers heat via conduction by the tube walls to the source fluid flowing within the tubes.

The source fluid may be provided to turbine 102 via source fluid outlet 216 and the exhaust fluid may be provided to compressor 104 via exhaust fluid outlet 214 (706). For example, heat exchanger 210 may include a portion of both source fluid flow path 122 and exhaust fluid flow path 120. Source fluid outlet 216 may be fluidically coupled to source fluid flow path 122 and may be configured to provide the source fluid, heated within heat exchanger 210, to turbine 102 by way of heater 106. Exhaust fluid outlet 214 may be fluidically coupled to exhaust fluid flow path 120 and may be configured to provide the exhaust fluid, cooled within heat exchanger 210, to compressor 104 by way of cooler 108.

Various examples have been described. These and other examples are within the scope of the following claims.

What is claimed is:

1. A heat exchanger comprising:
a shell configured to house a plurality of tubes and defining an exhaust fluid flow path within a first volume enclosed by the shell, the shell including an exhaust fluid inlet at a first end of the exhaust fluid flow path and an exhaust fluid outlet at a second end of the exhaust fluid flow path, wherein an outer surface of the plurality of tubes are in fluid communication with the flow path;
a cap configured to be attached to a first end of the shell and defining a second volume, the cap including a source fluid inlet at a first end of a source fluid flow path and a source fluid outlet at a second end of the source fluid flow path; and
a header configured to separate the first volume and the second volume, the header defining a tube inlet position and a tube outlet position of each of the plurality of tubes, wherein the tube inlets of the plurality of tubes are in fluid communication with the source fluid inlet and the tube outlets of the plurality of tubes are in fluid communication with the source fluid outlet, wherein the header is configured to flex with thermal expansion,
wherein each of the plurality of tubes are substantially U-shaped including a U-bend and define a flow path of the source fluid within the exhaust fluid flow path,
wherein the header comprises:
a first cross-sectional area including the plurality of tube inlets; and
a second cross-sectional area including the plurality of tube outlets, wherein the header is configured to reduce thermal conduction between the first cross-sectional area and the second cross-sectional area,
wherein the first cross-sectional area and the second-cross-sectional area are separated by a cross-sectional area having a thickness in a longitudinal direction that is less than a thickness in the longitudinal direction of both the first cross-sectional area and the second cross-sectional area.

2. The heat exchanger of claim 1, wherein each of the plurality of tubes are attached to the header at the tube inlet and tube outlet, and wherein each of the plurality of tubes are mechanically unconstrained at the U-bend and are configured to freely thermally expand in the longitudinal direction.

3. The heat exchanger of claim 2, wherein each of the plurality of tubes have an outer diameter of 5 millimeters (mm) or less and are configured to have a spacing between respective outer diameters of adjacent tubes of 3 mm or less.

4. The heat exchanger of claim 2, wherein each of the plurality of tubes have an outer diameter of 1 mm or less and are configured to have a spacing between respective outer diameters of adjacent tubes of 0.5 mm or less.

5. The heat exchanger of claim 1, further comprising:
at least one flow baffle within the exhaust fluid flow path configured to reduce an amount of the first volume in which the exhaust fluid may flow within the exhaust fluid flow path that bypasses the plurality of tubes.

6. The heat exchanger of claim 5, wherein the at least one flow baffle is configured to reduce an amount of exhaust fluid flowing along the shell.

7. The heat exchanger of claim 1, wherein the header is configured to reduce stress of the plurality of tubes via its flexibility with thermal expansion.

8. The heat exchanger of claim 1, wherein each tube inlet position of each of the plurality of tubes is co-planar with each tube outlet position of each of the plurality of tubes.

9. A system comprising:
a turbine mechanically coupled to a generator and a compressor; and
a heat exchanger fluidically coupled to the turbine and the compressor, the heat exchanger comprising:
a shell configured to house a plurality of tubes and defining an exhaust fluid flow path within a first volume enclosed by the shell, the shell including an exhaust fluid inlet at a first end of the exhaust fluid flow path and an exhaust fluid outlet at a second end of the exhaust fluid flow path, wherein an outer surface of the plurality of tubes are in fluid communication with the flow path;

a cap configured to be attached to a first end of the shell and defining a second volume, the cap including a source fluid inlet at a first end of a source fluid flow path and a source fluid outlet at a second end of the source fluid flow path; and a header configured to separate the first volume and the second volume, the header defining a tube inlet position and a tube outlet position of each of the plurality of tubes, wherein the tube inlets of the plurality of tubes are in fluid communication with the source fluid inlet and the tube outlets of the plurality of tubes are in fluid communication with the source fluid outlet, wherein the header is configured to flex with thermal expansion, wherein each of the plurality of tubes are substantially U-shaped including a U-bend and define a flow path of the source fluid within the exhaust fluid flow path, wherein the header comprises:
  a first cross-sectional area including the plurality of tube inlets; and
  a second cross-sectional area including the plurality of tube outlets, wherein the header is configured to reduce thermal conduction between the first cross-sectional area and the second cross-sectional area,
  wherein the first cross-sectional area and the second-cross-sectional area are separated by a cross-sectional area having a thickness in a longitudinal direction that is less than a thickness in the longitudinal direction of both the first cross-sectional area and the second cross-sectional area.

10. The system of claim 9, wherein the heat exchanger is configured to receive an exhaust fluid in the exhaust fluid flow path via the exhaust fluid inlet and a source fluid in the source fluid flow path via the source fluid inlet and transfer heat from the exhaust fluid to the source fluid.

11. The system of claim 10, wherein each of the plurality of tubes are attached to the header at the tube inlet and tube outlet, and wherein each of the plurality of tubes are mechanically unconstrained at the U-bend and are configured to freely thermally expand in the longitudinal direction.

12. The system of claim 11, wherein each of the plurality of tubes have an outer diameter of 5 millimeters (mm) or less and are configured to have a spacing between respective outer diameters of adjacent tubes of 3 mm or less.

13. The system of claim 11, wherein each of the plurality of tubes have an outer diameter of 1 mm or less and are configured to have a spacing between respective outer diameters of adjacent tubes of 0.5 mm or less.

14. The system of claim 9, wherein the header comprises:
  a first cross-sectional area including the plurality of tube inlets; and
  a second cross-sectional area including the plurality of tube outlets, wherein the header is configured to reduce thermal conduction between the first cross-sectional area and the second cross-sectional area.

15. The system of claim 14, wherein the first cross-sectional area and the second-cross-sectional area are separated by a cross-sectional area having a thickness that is less than a thickness of both the first cross-sectional area and the second cross-sectional area.

16. The system of claim 9, further comprising:
  at least one flow baffle within the exhaust fluid flow path configured to reduce an amount of the first volume in which the exhaust fluid may flow within the exhaust fluid flow path that bypasses the plurality of tubes, wherein the at least one flow baffle is configured to reduce an amount of exhaust fluid flowing along the shell.

17. The system of claim 9, wherein each tube inlet position of each of the plurality of tubes is co-planar with each tube outlet position of each of the plurality of tubes.

18. A method comprising:
  receiving a source fluid at a source fluid inlet of a heat exchanger;
  receiving an exhaust fluid at an exhaust fluid inlet of the heat exchanger;
  heating, via a heat exchanger, the source fluid via transfer of heat from the exhaust fluid, wherein the heat exchanger comprises:
    a shell configured to house a plurality of tubes and defining an exhaust fluid flow path within a first volume enclosed by the shell, the shell including an exhaust fluid inlet at a first end of the exhaust fluid flow path and an exhaust fluid outlet at a second end of the exhaust fluid flow path, wherein an outer surface of the plurality of tubes are in fluid communication with the flow path;
    a cap configured to be attached to a first end of the shell and defining a second volume, the cap including a source fluid inlet at a first end of a source fluid flow path and a source fluid outlet at a second end of the source fluid flow path; and
    a header configured to separate the first volume and the second volume, the header defining a tube inlet position and a tube outlet position of each of the plurality of tubes, wherein the tube inlets of the plurality of tubes are in fluid communication with the source fluid inlet and the tube outlets of the plurality of tubes are in fluid communication with the source fluid outlet, wherein the header is configured to flex with thermal expansion and reduce stress within the header and on the plurality of tubes,
  wherein each of the plurality of tubes have an outer diameter of 1 mm or less and are configured to have a spacing between respective outer diameters of adjacent tubes of 0.5 mm or less,
  wherein the header comprises:
    a first cross-sectional area including the plurality of tube inlets; and
    a second cross-sectional area including the plurality of tube outlets, wherein the header is configured to reduce thermal conduction between the first cross-sectional area and the second cross-sectional area,
    wherein the first cross-sectional area and the second-cross-sectional area are separated by a cross-sectional area having a thickness in a longitudinal direction that is less than a thickness in the longitudinal direction of both the first cross-sectional area and the second cross-sectional area.

19. The method of claim 18, wherein the source fluid is received from a compressor, wherein the exhaust fluid is received from a turbine that is mechanically coupled to a generator and the compressor, the method further comprising:
  providing, via the source fluid outlet, the source fluid to the turbine;
  providing, via the exhaust fluid outlet, the exhaust fluid to the compressor; and reducing, via at least one flow baffle, an amount of the first volume in which the exhaust fluid may flow within the exhaust fluid flow path that bypasses the plurality of tubes.

20. The method of claim 18, wherein each tube inlet position of each of the plurality of tubes is co-planar with each tube outlet position of each of the plurality of tubes.

* * * * *